(12) United States Patent
Carvalho et al.

(10) Patent No.: US 9,594,817 B2
(45) Date of Patent: Mar. 14, 2017

(54) SYSTEMS AND METHODS FOR RAPID PROCESSING OF FILE DATA (71) Applicant: Infosys Limited, Bangalore (IN)

(72) Inventors: Rebeck Carvalho, Thane (IN); Sriharsha Anand Pushkala, Hosur (IN); Rohit Saxena, Bangalore (IN)

(73) Assignee: Infosys Limited, Bangalore (IN)

( * ) Notice: Subject to any disclaimer, the term of this patent is extended or adjusted under 35 U.S.C. 154(b) by 307 days.

(21) Appl. No.: 14/573,665

(22) Filed: Dec. 17, 2014

(65) Prior Publication Data
US 2015/0186404 A1    Jul. 2, 2015

(30) Foreign Application Priority Data
Dec. 26, 2013 (IN) .................... 6083/2013

(51) Int. Cl.
*G06F 17/30* (2006.01)
(52) U.S. Cl.
CPC .............. *G06F 17/30563* (2013.01)
(58) Field of Classification Search
CPC ......... G06F 17/30156; G06F 17/30289; G06F 17/30563
USPC ........................ 707/602, 692, 694
See application file for complete search history.

(56) References Cited

U.S. PATENT DOCUMENTS

| | | | |
|---|---|---|---|
| 6,011,550 A | 1/2000 | Capps et al. | |
| 6,687,694 B2 * | 2/2004 | Miller | G06K 9/00973 706/20 |
| 6,792,145 B2 | 9/2004 | Gay | |
| 6,859,787 B2 | 2/2005 | Fisher et al. | |
| 6,876,978 B1 | 4/2005 | Walker et al. | |
| 7,139,726 B2 | 11/2006 | Fisher et al. | |
| 7,428,495 B2 * | 9/2008 | Dhar | A61J 9/00 705/7.26 |
| 7,900,826 B2 | 3/2011 | Feldman et al. | |

(Continued)

FOREIGN PATENT DOCUMENTS

| | | |
|---|---|---|
| CA | 2526283 A1 | 6/2006 |
| WO | 9912117 | 3/1999 |

(Continued)

OTHER PUBLICATIONS

Kwan et al., Dynamic Workflow Management: A Framework for Modeling Workflows, Proceedings of the Thirtieth Hawaii International Conference on System Sciences, Year: 1997, vol. 4, pp. 367-376 vol. 4.*

(Continued)

*Primary Examiner* — Greta Robinson
(74) *Attorney, Agent, or Firm* — Klarquist Sparkman, LLP (57) ABSTRACT The technique relates to a system and method for selecting dynamic workflow to process file data. This technique facilitates to process file data and business rules simultaneously and thus saves a lot of time. The technique involves receiving a request from File Pattern Recognition Engine (FPRE) to select rules for processing file data by Data Rule Engine (DRE) and to select business rules to be applied on the data by the Business Metrics Engine (BME). After that, DRE and BME select the possible set of rules and send the acknowledgement to FPRE. Thereafter, FPRE sends the signal to proceed to DRE and BME, and after receiving the signal DRE and BME apply at least one of the possible set of rules selected earlier.

16 Claims, 6 Drawing Sheets (56) References Cited

U.S. PATENT DOCUMENTS

| | | | |
|---|---|---|---|
| 8,073,722 B2 | 12/2011 | Biegler et al. | |
| 2002/0040304 A1* | 4/2002 | Shenoy | G06Q 30/06 705/35 |
| 2002/0198772 A1 | 12/2002 | Bates et al. | |
| 2004/0068424 A1* | 4/2004 | Lee | G06Q 10/06311 705/7.15 |
| 2005/0273708 A1 | 12/2005 | Motyka et al. | |
| 2006/0282878 A1* | 12/2006 | Stanley | H04L 63/0227 726/1 |
| 2012/0095973 A1* | 4/2012 | Kehoe | G06F 8/70 707/694 |
| 2013/0007063 A1 | 1/2013 | Kalra et al. | |
| 2013/0030898 A1 | 1/2013 | Burton | |
| 2014/0310231 A1* | 10/2014 | Sampathkumaran | G06F 17/30563 707/602 |

FOREIGN PATENT DOCUMENTS

| | | |
|---|---|---|
| WO | 2007005110 A2 | 1/2007 |
| WO | 2012167361 A1 | 12/2012 |

OTHER PUBLICATIONS

Moin Moinuddin, "An Overview of Service-Oriented Architecture in Retail", Microsoft Corporation, Jan. 2007.

Jelani Harper, "Analyzing Big Data: Lavastorm Analytics Engine", May 16, 2013, Lavastorm Analytics, http://www.lavastorm.com/document/analyzing-big-data-lavastorm-analytics-engine/.

Satoshi Tsuchiya et al. "Big Data Processing in Cloud Environments" Fujitsu Sc. Tech. J., vol. 48, No. 2, pp. 159-168 (Apr. 2012).

Linh T.X. Phan et al., "An Empirical Analysis of Scheduling Techniques for Real-time Cloud-based Data Processing", University of Pennsylvania.

P. Stecher, "Building business and application systems with the Retail Application Architecture", IBM Systems Journal, vol. 32, No. 2, 1993.

"Data Governance and Metadata Management", An Adaptive, Inc. White Paper, 2013.

* cited by examiner

SYSTEMS AND METHODS FOR RAPID PROCESSING OF FILE DATA

RELATED APPLICATION DATA

This application claims priority to India Patent Application No. 6083/CHE/2013, filed Dec. 26, 2013, the disclosure of which is hereby incorporated by reference in its entirety.

FIELD OF THE INVENTION

The invention relates generally to rapid processing of file data, and in particular, to a system and method for selecting dynamic workflow to process files data.

BACKGROUND

Processing and analyzing huge incoming data is essential for supply chain management. Conventional systems initially load data acquired from different sources into the database. During this process the data is cleaned which involves validating (null columns check, specific data type check and so on) and checking for duplicate records. Once the cleansed data has been loaded, then ETL (extraction, transformation and load) operation are performed to calculate cubes or aggregate tables for business metrics used for real-time business analytics. This two tier approach takes lot of time to process the data

SUMMARY

The present technique overcomes the above mentioned limitation by using a single tier system which can process data and business rules simultaneously thereby achieving faster real-time processing. The present technique is capable of determining, at the start of processing of unknown data or file, what business rules can be applied. Further, it can select workflow, for both data processing and business rules, of an unknown file to a particular client. Additionally, it can collect and collate the real-time business metrics when the file is being processed and also can use pre-cached set of rules which should result in faster fetch time for the rules.

According to the present embodiment, a method for selecting dynamic workflow to process file data is disclosed. The method includes receiving a request from a file pattern recognition engine for dynamic workflow selection for a file, wherein the request is accompanied with one or more file details. Thereafter, dynamic workflow for the file is selected in response to the request based on the one or more received file details, wherein the selection comprises fetching simultaneously one or more possible set of business rules and possible set of file level rules associated with the file from one or more pre-cached rules stored in a repository. After that, an acknowledgement of the dynamic workflow selection is sent to the file pattern recognition engine. Further, a signal is received from the file pattern recognition engine to apply at least one of the one or more possible set of business rules and file level rules. Finally, the at least one of the one or more possible set of business rules and file level rules are applied on the said file.

In an additional embodiment, a system for selecting dynamic workflow to process file data is disclosed. The system includes a dynamic workflow selection request receiver, a dynamic workflow selector, an acknowledgement sender, a signal receiver and a rule application component. The dynamic workflow selection request receiver is configured for receiving a request from a file pattern recognition engine for dynamic workflow selection for a file, wherein the request is accompanied with one or more file details. The dynamic workflow selector is configured for selecting dynamic workflow for the file in response to the request based on the one or more received file details, wherein the selection comprises fetching simultaneously one or more possible set of business rules and possible set of file level rules associated with the file from one or more pre-cached rules stored in a repository. The acknowledgement sender is configured for sending an acknowledgement of the dynamic workflow selection to the file pattern recognition engine. The signal receiver is configured for receiving a signal from the file pattern recognition engine to apply at least one of the one or more possible set of business rules and file level rules. The rule application component is configured for applying the at least one of the one or more possible set of business rules and file level rules on the said file.

In another embodiment, a computer readable storage medium for selecting dynamic workflow to process file data is disclosed. The computer readable storage medium which is not a signal stores computer executable instructions for receiving a request from a file pattern recognition engine for dynamic workflow selection for a file, wherein the request is accompanied with one or more file details. Further instructions for selecting dynamic workflow for the file in response to the request based on the one or more received file details, wherein the selection comprises fetching simultaneously one or more possible set of business rules and possible set of file level rules associated with the file from one or more pre-cached rules stored in a repository. Still further instructions for sending an acknowledgement of the dynamic workflow selection to the file pattern recognition engine, receiving a signal from the file pattern recognition engine to apply at least one of the one or more possible set of business rules and file level rules and applying the at least one of the one or more possible set of business rules and file level rules on the said file.

BRIEF DESCRIPTION OF THE DRAWINGS

Various embodiments of the invention will, hereinafter, be described in conjunction with the appended drawings. There is no intention to limit the scope of the invention to such blocks or objects, or to any particular technology. Instead these simplified diagrams are presented by way of illustration to aid in the understanding of the logical functionality of one or more aspects of the instant disclosure and is not presented by way of limitation.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Exemplary embodiments of the present invention provide a system and method for selecting dynamic workflow to process file data. This technique facilitates to process file data and business rules simultaneously and thus saves a lot of time. The technique involves receiving a request from File Pattern Recognition Engine (FPRE) to select rules for processing file data by Data Rule Engine (DRE) and to select business rules to be applied on the data by the Business Metrics Engine (BME). After that, DRE and BME select the possible set of rules and send the acknowledgement to FPRE. Thereafter, FPRE sends the signal to proceed to DRE and BME, and after receiving the signal DRE and BME apply at least one of the possible set of rules selected at the earlier step.

Figure 1:
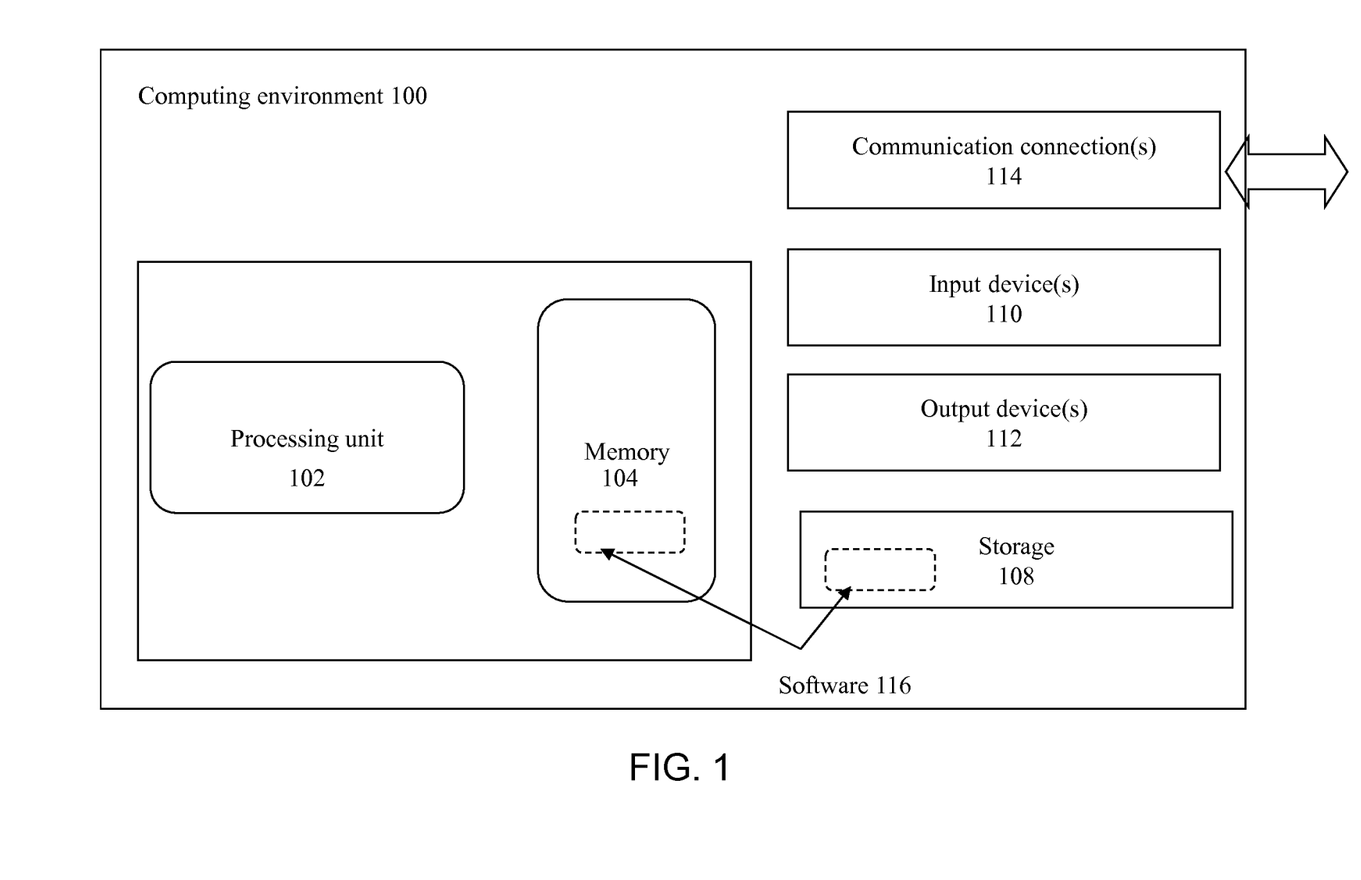
FIG. 1 is a computer architecture diagram illustrating a computing system capable of implementing the embodiments presented herein.

FIG. 1 illustrates a generalized example of a suitable computing environment 100 in which all embodiments, techniques, and technologies of this invention may be implemented. The computing environment 100 is not intended to suggest any limitation as to scope of use or functionality of the technology, as the technology may be implemented in diverse general-purpose or special-purpose computing environments. For example, the disclosed technology may be implemented using a computing device (e.g., a server, desktop, laptop, hand-held device, mobile device, PDA, etc.) comprising a processing unit, memory, and storage storing computer-executable instructions implementing the service level management technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, and the like.

With reference to FIG. 1, the computing environment 100 includes at least one central processing unit 102 and memory 104. The central processing unit 102 executes computer-executable instructions. In a multi-processing system, multiple processing units execute computer-executable instructions to increase processing power and as such, multiple processors can be running simultaneously. The memory 104 may be volatile memory (e.g., registers, cache, RAM), non-volatile memory (e.g., ROM, EEPROM, flash memory, etc.), or some combination of the two. The memory 104 stores software 116 that can implement the technologies described herein. A computing environment may have additional features. For example, the computing environment 100 includes storage 108, one or more input devices 110, one or more output devices 112, and one or more communication connections 114. An interconnection mechanism (not shown) such as a bus, a controller, or a network, interconnects the components of the computing environment 100. Typically, operating system software (not shown) provides an operating environment for other software executing in the computing environment 100, and coordinates activities of the components of the computing environment 100.

Figure 2:
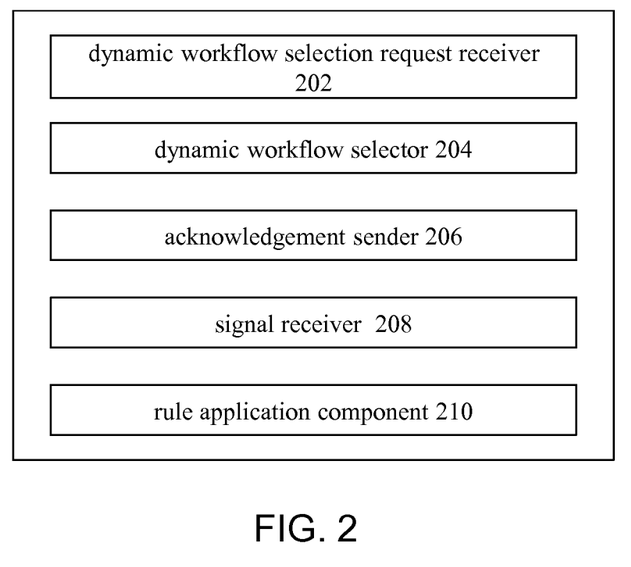
FIG. 2 is a block diagram illustrating a system for selecting dynamic workflow to process file data, in accordance with an embodiment of the present invention.

FIG. 2 is a block diagram illustrating a system for selecting dynamic workflow to process file data, in accordance with an embodiment of the present invention. The system includes a dynamic workflow selection request receiver 202, a dynamic workflow selector 204, an acknowledgement sender 206, a signal receiver 208 and a rule application component 210. The system includes a dynamic workflow selection request receiver 202 receives a request from a File Pattern Recognition Engine (FPRE) to select dynamic workflow for the concerned file. The dynamic workflow selector 204 selects dynamic workflow for the file in response to the request based on the one or more received file details, wherein the selection comprises fetching simultaneously one or more possible set of business rules and possible set of file level rules associated with the file from one or more pre-cached rules stored in a repository. In various embodiments of the present disclosure, the dynamic workflow selector 204 includes Data Rule Engine (DRE) and Business Metrics Engine (BME) which are described in detail herein below. The acknowledgement sender 206 sends an acknowledgement of the dynamic workflow selection to the FPRE. The signal receiver 208 receives a signal from the FPRE to apply at least one of the one or more possible set of business rules and file level rules. The rule application component 210 applies the at least one of the one or more possible set of business rules and file level rules on the said file. Details about the rule application are mentioned herein below.

Figure 3:
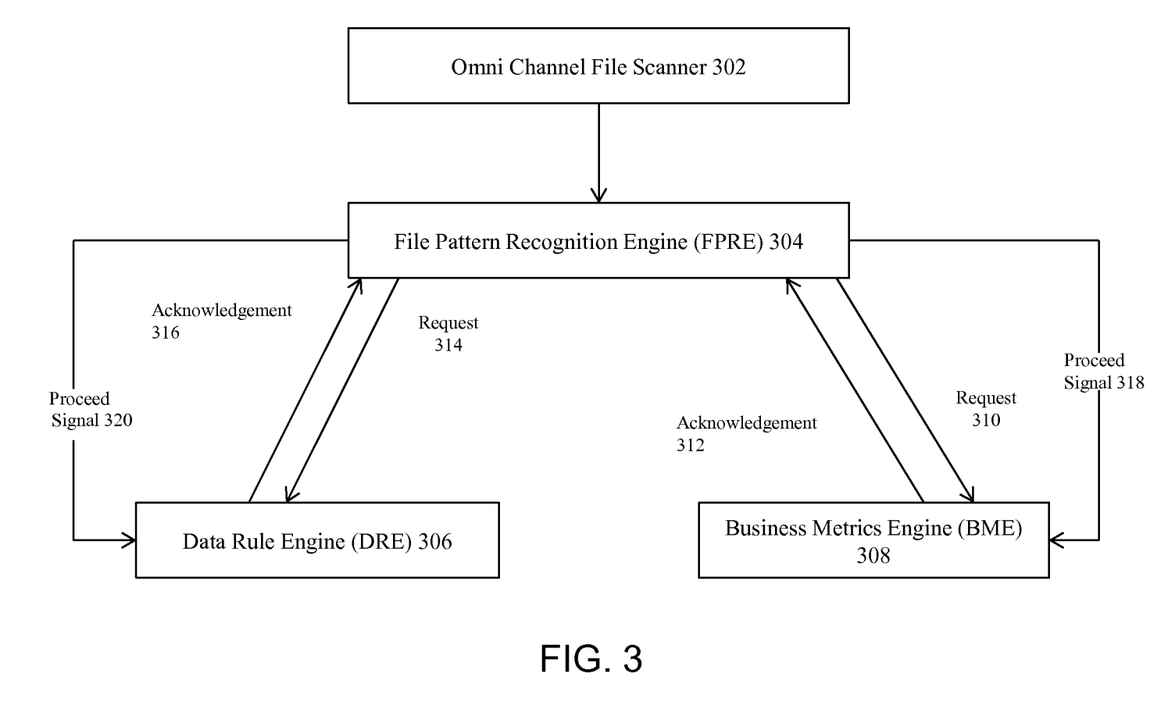
FIG. 3 illustrates an overall interaction of File Pattern Recognition Engine with Data Rule Engine and Business Metrics Engine for dynamic workflow selection.

FIG. 3 illustrates an overall interaction of File Pattern Recognition Engine (FPRE) with Data Rule Engine (DRE) and Business Metrics Engine (BME) for dynamic workflow selection. In various embodiments of the present disclosure, the dynamic workflow selection happens concurrently by FPRE in unison with BME and DRE. The BME is responsible to fetch the Business rules for real time analytics and start collecting the metrics based on past business metrics used by each company or tenant for the specific file . The DRE is responsible for fetching the File Specific Rules based on the historic data of the file The files which come for processing can come via different protocols. The Omni Channel File Scanner (OCFS) 302 scans the various channels and keep track of any incoming file from the client. There can be multiple threads which will be spawning to cater to each of these channels. The files are scanned to detect any malignant files and to check whether it contains any malware or viruses. Once these checks are done the file will be sent to the next component FPRE 304. The received files may be configured differently in different scenarios. It may have different file formats, may have incomplete or missing data, it may have duplicate data, it may be a bunch of files zipped together. The main functions of FPRE 304 include to identify different file formats and to take action for each of them appropriately. If the file format is invalid then FPRE 304 rejects the file. The FPRE 304 checks the partner name to which the file is subscribed. The FPRE 304 also checks for any duplicate file. The FPRE 304 analyzes the file and based on historical data for the same partner files it suggests the next course of action. For example, if for a Partner ABC, most of the files which come tend have a lot of white spaces which need to be trimmed, then when a new file come for that partner, FPRE 304 based on previous occurrences suggests the user to clean all the white spaces in the file. Thereafter, FPRE sends a request (310) for selecting business rules to BME 308 and another request (314) for selecting a file or data level rules to DRE 306. The BME 308 uses the file details received along with the request (310) and mines the possible set of Business Rules applicable for the file and sends an acknowledgement (312), once mined, to FPRE 304. Then, BME 308 receives a signal (318) from FPRE 304 and starts the processing. On the other hand, DRE 306 also uses the file details received along with the request and mines the possible set of File/data level Rules and sends an acknowledgement (316), once mined, to FPRE 304. Thereafter, the DRE 306 receives a signal (320) from FPRE 304 and starts the processing. In various embodiments of the present disclosure, the proceed signal is sent by the FPRE 304 based on the pre-configured preferences of the partner.

Figure 4:
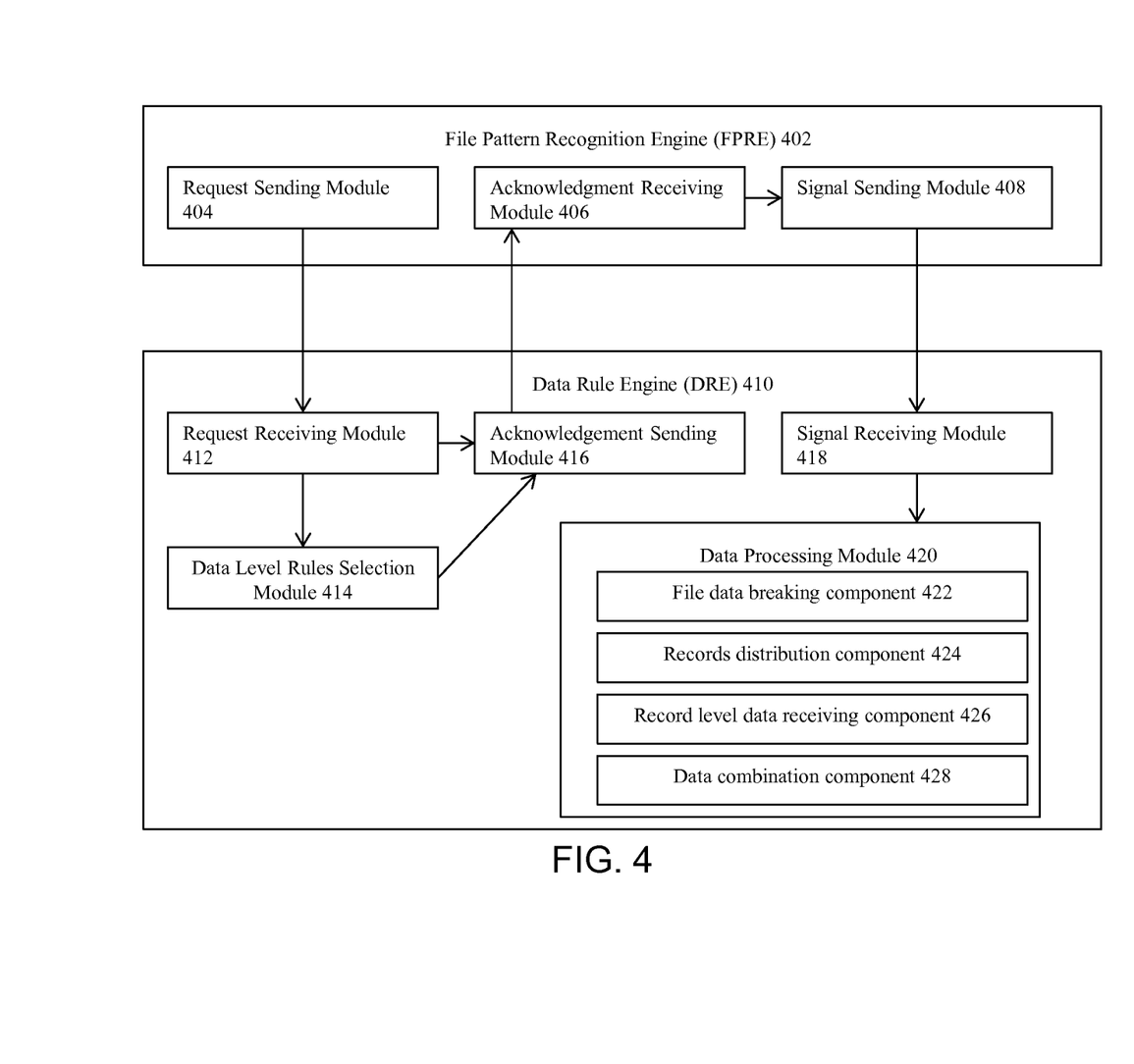
FIG. 4 depicts detailed interaction of File Pattern Recognition Engine with Data Rule Engine.

FIG. 4 depicts detailed interaction of File Pattern Recognition Engine (FPRE) 402 with Data Rule Engine (DRE) 410. A request is received by the request receiving module 412 of the DRE 410 coming from the request sending module 404 of FPRE 402 with the file details in a context over a messaging protocol. Then data level rule selection module 414 of DRE 410 receives the context and fetches the rules from pre-cached rules in a non-relational database (based on the historical rules applied). These fetched rules are the nearest match data rules to be applied on the file. The acknowledgement sending module 416 of DRE 410 sends an acknowledgement back to acknowledgement receiving module 406 of FPRE 402. Further, the signal sending module 408 of FPRE 402 sends a proceed signal to DRE 410. The signal receiving module 418 of DRE 410 receives the proceed signal and start the processing with the help of data processing module 420. The data processing module 420 includes file data breaking component 422, records distribution component 424, record level data receiving component 426 and data combination component 428. The file data breaking component 422 breaks the entire data sets into records. The records distribution component 424 distributes records into many worker nodes for record level rule application. Then, each worker node processes a bunch of records of data and sends it back to the record level data receiving component 426 and the data combination component 428 combines the result for the desired output. The data combination component 428 takes care of marshaling the distributed nodes, running the various tasks in parallel, managing all communications and data transfers between the various nodes of the system, providing for redundancy and failures, and overall management of the whole process. Finally another signal is sent back to FPRE 402 to mark the completion of the rules application. In accordance with an embodiment of the present disclosure, The data rule engine applies the rules using map-reduce and FPRE 402 loads the data into a No-SQL data base before the data is sent further for processing.

Figure 5:
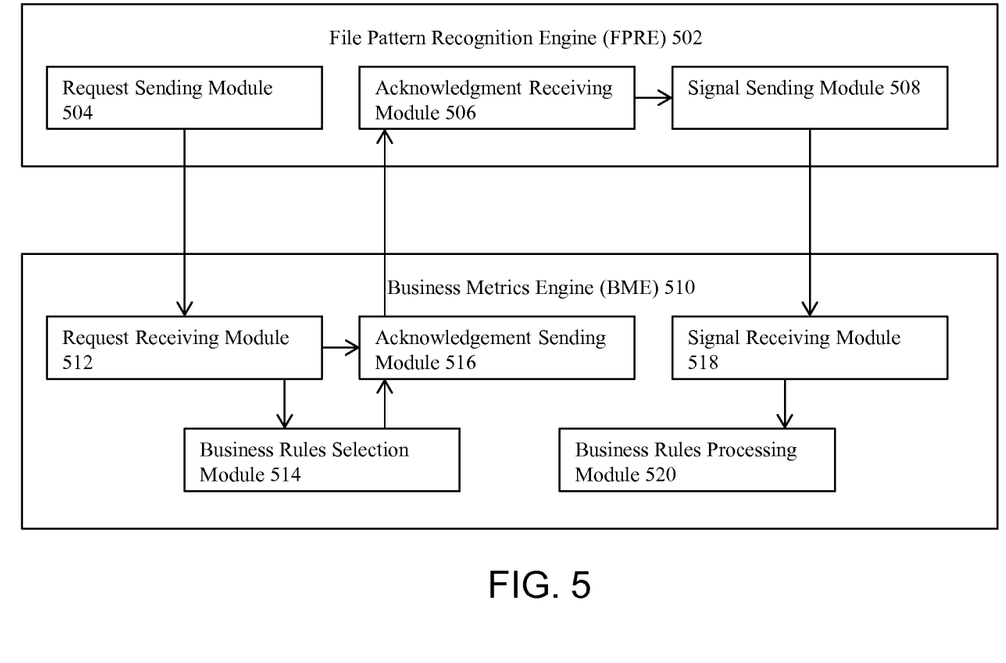
FIG. 5 depicts detailed interaction of File Pattern Recognition Engine with Business Metrics Engine.

FIG. 5 depicts detailed interaction of File Pattern Recognition Engine (FPRE) with Business Metrics Engine (BME). A request is received by the request receiving module 512 of the BME 510 coming from the request sending module 504 of FPRE 502 with the file details in a context over a messaging protocol. Then business rule selection module 514 of BME 510 receives the context and fetches the rules from pre-cached rules in a non-relational database (based on the historical rules applied). These fetched rules are the nearest match data rules to be applied on the file. The acknowledgement sending module 516 of BME 510 sends an acknowledgement back to acknowledgement receiving module 506 of FPRE 502. The signal sending module 508 of FPRE 502 sends BME 510 to proceed to apply the real-time rules for the file. After the signal receiving module 518 of BME 510 receives the proceed signal from FPRE 502, the business rule processing module 520 of BME 510 starts processing the analytics data based on the data that is pre-loaded by FPRE 502 with directions based on the Business Rules collected before the real-time analytics process. In accordance with an embodiment of the present disclosure, The BME 510 contains a NOSQL dictionary of commonly used business metrics mined depending on the type of the file and distributor.

Figure 6:
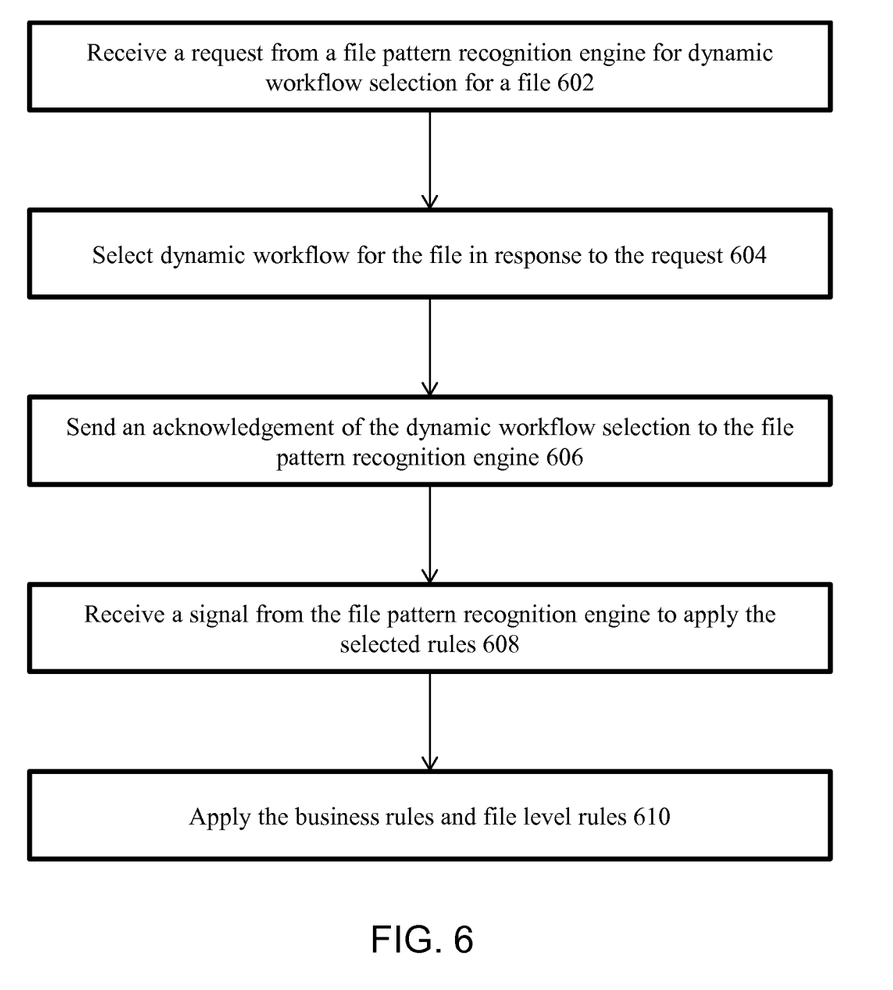
FIG. 6 is a flowchart, illustrating a method for selecting dynamic workflow to process file data, in accordance with an embodiment of the present invention.

FIG. 6 is a flowchart, illustrating a method for selecting dynamic workflow to process file data, in accordance with an embodiment of the present invention. A request from the File Pattern Recognition Engine (FPRE) is received for dynamic workflow selection of the file, as in step 602. The request is accompanied with file details. The FPRE identifies a partner subscribed for the said file and one or more preferences of the partner with respect to the processing of the file data. Further, FPRE removes one or more duplicate files. Then, the dynamic workflow is selected for the file based on the one or more received file details, as in step 604. In various embodiments of the present disclosure, the dynamic workflow selection represents simultaneous fetching of one or more possible set of business rules and possible set of file level rules associated with the file from one or more pre-cached rules stored in a repository. An acknowledgement of the dynamic workflow selection is sent to the FPRE, as in step 606. A signal is received from the FPRE to apply at least one of the possible set of business rules and file level rules, as in step 608. The at least one of the possible set of business rules and file level rules are applied on the said file, as in step 610. In case of data/file level rule application, the entire data set is broken into records and these records are distributed to many worker nodes for record level rule application. Each worker node processes a bunch of records of data. The processed record data are combined to get the desired output after receiving the record data from various worker nodes.

The above mentioned description is presented to enable a person of ordinary skill in the art to make and use the invention and is provided in the context of the requirement for obtaining a patent. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

What is claimed is:

1. A computer implemented method for selecting dynamic workflow to process file data, comprising:
    receiving, by at least one computing device, a request from a file pattern recognition engine for dynamic workflow selection for a file, wherein the request is accompanied with one or more file details;
    selecting, by the at least one computing device, dynamic workflow for the file in response to the request based on the one or more received file details, wherein the selection comprises fetching simultaneously one or more possible set of business rules and possible set of file level rules associated with the file from one or more pre-cached rules stored in a repository;

sending, by the at least one computing device, an acknowledgement of the dynamic workflow selection to the file pattern recognition engine;

in response to the acknowledgement, receiving, by the at least one computing device, a signal from the file pattern recognition engine to apply at least one of the one or more possible set of business rules and file level rules; and applying, by the at least one computing device, the at least one of the one or more possible set of business rules and file level rules on the said file.

2. The method as claimed in claim 1, wherein the file is scanned by an omni channel file scanner before receiving the request for the dynamic workflow selection.

3. The method as claimed in claim 1, wherein the file pattern recognition engine identifies a partner subscribed for the said file.

4. The method as claimed in claim 1, wherein the file pattern recognition engine identifies one or more preferences of the partner with respect to the processing of the file data.

5. The method as claimed in claim 1, wherein the file pattern recognition engine removes one or more duplicate files.

6. The method as claimed in claim 1, wherein the file pattern recognition engine determines the applicability of the one or more possible set of business rules and possible set of file level rules based on one or more predefined preferences of a partner subscribed for the file.

7. The method as claimed in claim 1, wherein the application of the at least one of the one or more possible set of file level rules comprises:

breaking the file data into a plurality of records;

distributing the plurality of records to a plurality of worker nodes for processing record level data, wherein the processing involves record level rule application;

receiving the processed record level data from the plurality of worker nodes; and combining the processed record level data received from the plurality of worker nodes to get a desired output.

8. A system for selecting dynamic workflow to process file data, comprising:

a processor in operable communication with a processor readable storage medium, the processor readable storage medium containing one or more programming instructions whereby the processor is configured to implement:

a dynamic workflow selection request receiver, wherein the dynamic workflow selection request receiver receives a request from a file pattern recognition engine for dynamic workflow selection for a file, wherein the request is accompanied with one or more file details;

a dynamic workflow selector, wherein the dynamic workflow selector selects dynamic workflow for the file in response to the request based on the one or more received file details, wherein the selection comprises fetching simultaneously one or more possible set of business rules and possible set of file level rules associated with the file from one or more pre-cached rules stored in a repository;

an acknowledgement sender, wherein the acknowledgement sender sends an acknowledgement of the dynamic workflow selection to the file pattern recognition engine;

a signal receiver, wherein the signal receiver receives a signal from the file pattern recognition engine in response to the acknowledgement to apply at least one of the one or more possible set of business rules and file level rules; and a rule application component, wherein the rule application component applies the at least one of the one or more possible set of business rules and file level rules on the said file.

9. The system as claimed in claim 8 further comprises an omni channel file scanner, wherein the omni channel file scanner scans the file before receiving the request for the dynamic workflow selection.

10. The system as claimed in claim 8, wherein the file pattern recognition engine identifies a partner subscribed for the said file.

11. The system as claimed in claim 8, wherein the file pattern recognition engine identifies one or more preferences of the partner with respect to the processing of the file data.

12. The system as claimed in claim 8, wherein the file pattern recognition engine removes one or more duplicate files.

13. The system as claimed in claim 8, wherein the file pattern recognition engine determines the applicability of the one or more possible set of business rules and possible set of file level rules based on one or more predefined preferences of a partner subscribed for the file.

14. The system as claimed in claim 8, wherein the dynamic workflow selector comprises a data rule engine and a business metrics engine.

15. The system as claimed in claim 8, wherein the at least one of the one or more possible set of file level rules application component further comprises:

a file data breaking component configured to break the file data into a plurality of records;

a records distribution component configured to distribute the plurality of records to a plurality of worker nodes for processing record level data, wherein the processing involves record level rule application;

a record level data receiving component configured to receive the processed record level data from the plurality of worker nodes; and a data combination component configured to combine the processed record level data received from the plurality of worker nodes to get a desired output.

16. A non-transitory computer readable medium having stored thereon instructions for selecting dynamic workflow to process file data, comprising machine executable code which when executed by at least one processor, causes the at least one processor to perform steps comprising:

receiving a request from a file pattern recognition engine for dynamic workflow selection for a file, wherein the request is accompanied with one or more file details;

selecting dynamic workflow for the file in response to the request based on the one or more received file details, wherein the selection comprises fetching simultaneously one or more possible set of business rules and possible set of file level rules associated with the file from one or more pre-cached rules stored in a repository;

sending an acknowledgement of the dynamic workflow selection to the file pattern recognition engine;

in response to the acknowledgement, receiving a signal from the file pattern recognition engine to apply at least one of the one or more possible set of business rules and file level rules; and applying the at least one of the one or more possible set of business rules and file level rules on the said file.

\* \* \* \* \*